US006250626B1

(12) United States Patent
Tanaka

(10) Patent No.: US 6,250,626 B1
(45) Date of Patent: Jun. 26, 2001

(54) SHEET DISCHARGING APPARATUS

(75) Inventor: Yoshitaka Tanaka, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/435,463

(22) Filed: Nov. 8, 1999

(30) Foreign Application Priority Data

Nov. 12, 1998 (JP) ........................................ 10-322186

(51) Int. Cl.[7] ........................................ B65G 29/40
(52) U.S. Cl. ........................ 271/178; 271/225; 271/314
(58) Field of Search ........................ 271/178, 179, 271/225, 314

(56) References Cited

U.S. PATENT DOCUMENTS 3,223,409 * 12/1965 Eissfeld et al. .................. 271/179
3,317,225 * 5/1967 Copoper .......................... 403/97
3,568,860 * 3/1971 Rawlins .......................... 271/178
4,844,439 * 7/1989 Johansson ........................ 271/178
4,974,826 * 12/1990 Svatsky et al. .................. 271/179
5,301,570 * 4/1994 Li ............................... 403/97

* cited by examiner

*Primary Examiner*—Christopher P. Ellis
*Assistant Examiner*—Mark A. Deuble
(74) *Attorney, Agent, or Firm*—Kanesaka & Takeuchi

(57) ABSTRACT

A sheet discharging apparatus adapted to receive a sheet conveyed thereto, the sheet discharging apparatus has a pair of axes situated parallel to each other at a predetermined distance away from each other, the axes being located along two side edges of the sheet, and rotated in directions opposite to each other; a pair of supporting devices, each supporting device rotatably attached to each of the axes and having at least one supporting portion for supporting the side edge of said sheet; urging devices attached to the respective axes and pressing rear portions of the supporting devices forward; engaging members attached to the axes respectively, each engaging member engaging each of the supporting devices pressed by the urging devices so that the supporting device and the axis are joined to rotate in the same direction; and engaging portions formed at respective front portions of the supporting devices, each engaging portion having a recess and a protrusion alternately formed along a rotating direction of the axis, the recess allowing each of the supporting devices to be situated at a predetermined position in the rotating direction of the axis when engaging the engaging member.

4 Claims, 12 Drawing Sheets

SHEET DISCHARGING APPARATUS

BACKGROUND OF THE INVENTION

1. Field of the Invention

The present invention relates to a sheet discharging apparatus wherein a sheet conveyed thereto is received by a pair of rotating blades thereof and then conveyed downwards.

2. Description of the Related Art

In Japanese Patent Application No. 6-101236, the present applicant proposed an invention relating to a sheet discharging apparatus for a printing machine. This invention has been made public in Japanese Patent Publication No. 7-309496. This invention will be explained referring to FIGS. 4 to 10.

As illustrated in FIG. 4, an outlet 300*a* of a printing machine 300 is connected to an inlet of a sheet discharging apparatus 101 through a sheet conveying apparatus 100. The sheet conveying apparatus 100 has plural endless belts driven by a conveying motor. A post card as a sheet is printed by the printing machine 300, and conveyed by the sheet conveying apparatus 100, and then received in the sheet discharging apparatus 101. Ink on the post card as received is dried while the card is supported and conveyed in the sheet discharging apparatus 101. Then, the post card is dropped onto a tray 116 situated in a lower part of the sheet discharging apparatus 101, and stored therein.

As illustrated in FIG. 5, the sheet conveying apparatus 100 includes a conveying surface 102 for guiding a sheet and a belt 105 for conveying the sheet along the conveying surface 102.

As illustrated in FIG. 5, the sheet discharging apparatus 101 has, as a main body, a frame 110 approximately in a form of a box. On an upper portion of the frame 110, two shafts 111 are situated along two side edges of the sheet to be conveyed, respectively. Each shaft 111 has a rotating blade 112 including four plates.

As illustrated in FIG. 6, the two shafts are situated parallel with each other and rotated inwardly in directions opposite to each other. Namely, the left shaft rotates clockwise, and the right shaft rotates anticlockwise, as seen in a vertical plane perpendicular to the shaft 111. The two rotating blades 112 fitted on the respective shafts coincide with each other in rotational phases thereof. Namely, positions of respective plates of one rotating blade coincide with those of the other rotating blade in the rotational direction.

As illustrated in FIG. 5, in the frame 110, a pair of upper and lower driving axes 113 is situated below each of the shafts 111. The driving axes 113, 113 of the same pair are connected by two belts 114. Each of the belts 114 has many receiving flaps 115 formed at a predetermined distance therebetween.

A discharging tray 116 is drawably situated at the bottom of the frame 110.

The sheet, after being printed thereon by the printing machine 300, is discharged to the outside of the machine. The printed sheet discharged from the printing machine 300 is placed on the conveying surface 102 of the sheet conveying apparatus 100. The belt 105 moves along the conveying surface 102. The sheet is supported at both side edges thereof by the pair of the rotating blades 112. Upon rotation of the shaft 111, the sheet is downwardly conveyed and held by the receiving flaps 115 therebetween. Moving belts 114 convey the sheet downwardly. Ink printed on the sheet is dried during conveyance, and then the sheet is dropped onto the discharging tray 116 to be stacked thereon.

In using the sheet discharging apparatus, inconvenience such that the printing sheet comes out of the belts 114 or plural sheets are supported on one receiving flap 115 may be caused. In this case, the printing sheet must be taken out from between the belts 114, 114 by a hand inserted between the two rotating blades 112, 112. The rotating blade 112 is freed from rotation of the shaft 111 when being touched by the hand and not driven by the shaft 111. Thus, safety in such manual operation is ensured even when the shaft 111 is rotating. Namely, the rotating blades 112 may not bite hands of an operator in such operation.

That is, in the sheet discharging apparatus 101, the rotating blade 112 and the shaft 111 are not completely connected with each other, therefore the rotating blade 112 can rotate freely relative to the shaft 111 when being affected by force. Namely, as illustrated in FIGS. 7 and 8, the rotating blade 112 includes an axis portion 120 rotatably fitted on the shaft 111 and four plates attached to an outer circumferential surface of the axis portion 120. The four plates are arranged to be spaced apart by an angle of 45°. A coil spring 130 is fitted on the shaft 111 on a rear side of the rotating blade 112. A stopper 131 is fitted on the shaft 111 on a rear side of the coil spring 130. An engaging member 132, a pin, is attached to the shaft 111 on a forward side of the rotating blade 112. Engaging holes 135 are formed on a front-end portion of the rotating blade 112. The form of the engaging hole coincides with that of the engaging member 132. The coil spring 130 presses the rotating blade 112, thereby forcing the engaging holes 135 to be engaged with the engaging members 132. Thus, the shaft 111 and the rotating blade 112 are joined to rotate together.

When the rotating blade 112 is pressed in a direction opposite to the pressing direction of the coil spring 130, the coil spring 130 is compressed, thereby allowing the rotating blade 112 to come out of the engaging members 132. When the pressing force disappears, the rotating blade 112 is pressed by the coil spring 130 to come into contact with the engaging members 132, again. Thus, the rotating blade 112 and the shaft 111 come to rotate together.

As previously mentioned, in the sheet discharging apparatus 101, the rotating blade 112 and the shaft 111 are not completely connected with each other. The rotating blade 112 gets detached from the shaft 111 when being pressed in the direction for compressing the coil spring 130, thereby being freed from rotation of the shaft 111. And, when the outer force disappears, the rotating blade 112 is pressed by the coil spring 130 to again contact the engaging members 132, thereby interlocking the shaft 111. However, unless the engaging members 132 engage the engaging holes 135, a rotational phase between the shaft 111 and the rotating blade 112 is not set at a predetermined constant state. Consequently, after the operation as mentioned before for removing the printing sheet, phases of the respective two rotating blades 112, 112, i.e. positions of the plates 121 of each rotating blade in the rotational direction, may be displaced relative to each other.

Suppose a printing sheet 200 is supplied onto the two rotating blades 112, 112 whose phases are displaced relative to each other by an angle of 15° as illustrated in FIG. 9. In the drawing, the left rotating blade 112L is set at a predetermined proper phase for receiving the printing sheet 200 to be processed, and a phase of the right rotating blade 112R is displaced by an angle of 15°. As illustrated in FIG. 10, if the printing sheet 200 is supplied towards the rotating blades 112L, 112R, it collides with the plate 121 of the rotating blade 112R in the displaced phase. The rotating blade 112R fails to regularly receive the printing sheet 200, or fails to convey the sheet to the belt 114. In this way, sheet jamming occurs while conveying the sheet.

An object of the present invention is, in a sheet discharging machine having a pair of rotating blades detachably connected to respective rotating shafts, to allow phases of the two rotating blades to always coincide with each other.

SUMMARY OF THE INVENTION

A sheet discharging apparatus as defined in a first aspect of the present invention is adapted to receive a sheet conveyed thereto, the sheet discharging apparatus comprises a pair of axes situated parallel to each other at a predetermined distance away from each other, the axes being located along two side edges of the sheet, and rotated in directions opposite to each other; a pair of supporting means, each supporting means rotatably attached to each of the axes and having at least one supporting portion for supporting the side edge of the sheet; urging means attached to the respective axes and pressing rear portions of the supporting means forward; engaging members attached to the axes respectively, each engaging member engaging each of the supporting means pressed by the urging means so that the supporting means and the axis are joined to rotate in the same direction; and engaging portions formed at respective front portions of the supporting means, each engaging portion having a recess and a protrusion alternately formed along a rotating direction of the axis, the recess allowing each of the supporting means to be situated at a predetermined position in the rotating direction of the axis when engaging the engaging member.

A sheet discharging apparatus as defined in a second aspect of the present invention is adapted to receive a rectangular sheet conveyed thereto, the sheet discharging apparatus comprises a pair of axes situated parallel to each other at a predetermined distance away from each other, the axes being located along two side edges of the sheet and rotated in directions opposite to each other, the side edges being parallel to a conveying direction of the sheet, a pair of rotating blades, each rotating blade having an axis portion rotatably attached to each of the axes and plural plates attached to an outer circumferential surface of the axis portion, the plates being arranged to be spaced apart by a predetermined angular interval therebetween in a rotating direction of the axis and being parallel to the axes, each of the plates supporting the side edge of the sheet; elastic pressing members attached to each of the axes and pressing rear portions of the rotating blades forward; engaging members protrusively attached to respective outer circumferential surfaces of the axes, each engaging member engaging the rotating blade pressed by the elastic pressing member so that the rotating blade and the axis are joined to rotate in the same direction; and engaging portions formed at front portions of the respective rotating blades, each engaging portion having same number of recesses and protrusions as that of the plates, the recess and the protrusion being alternately arranged along the rotating direction of the axis, each recess allowing the rotating blade to be situated at a predetermined position in the rotating direction of the axis when engaging the engaging member.

According to a sheet discharging apparatus as defined in a third aspect of the present invention, in the sheet discharging apparatus of the second aspect, the engaging portion having the recesses and the protrusions includes a guiding slope, the guiding slope curving back and forth passing through said recesses and said protrusions in a direction of the axis and continuing along a circumference of the axis, and the engaging member is positioned at a bottom of the recess while being pressed and moved along the guiding slope.

According to a sheet discharging apparatus as defined in a fourth aspect of the present invention, in the sheet discharging apparatus of the third aspect, the engaging portion includes notches, each notch being formed at the bottom of each recess for engaging the engaging member.

According to the constitution thus explained, when the rotating blade is moved while being pressed in a direction opposite to that of urging force by the urging means, the engaging portion gets detached from the engaging member. Thus, the rotating blade comes to be rotatable relative to the shaft. After disengagement of the engaging portion from the engaging member, if the pressing force exerted on the rotating blade disappears, the rotating blade moves towards the engaging member by the urging force, and the engaging portion engages the engaging member, again. Since engaging member engages a part of the engaging portion where a recess and a protrusion are alternately formed along a circumferential direction, engaging member is moved to be positioned at a bottom of the recess while being pressed against the engaging portion by the urging force. Positions of the recesses relative to the respective plates of the rotating blade are uniformly predetermined; therefore each phase of the plates of the two rotating blades mounted on respective two shafts coincides with each other.

BRIEF DESCRIPTION OF THE DRAWINGS

FIG. 3(*b*) is a view illustrating a rotating blade in an operating condition in one embodiment of the present invention;

FIG. 3(*c*) is a view illustrating a rotating blade in an operating condition in one embodiment of the present invention;

DETAILED DESCRIPTION OF PREFERRED EMBODIMENTS

A preferred embodiment of the present invention will be explained referring to FIGS. 1 to 3.

A sheet discharging apparatus of the present embodiment is used while being connected to a printing machine by a sheet conveying apparatus.

Figure 5:
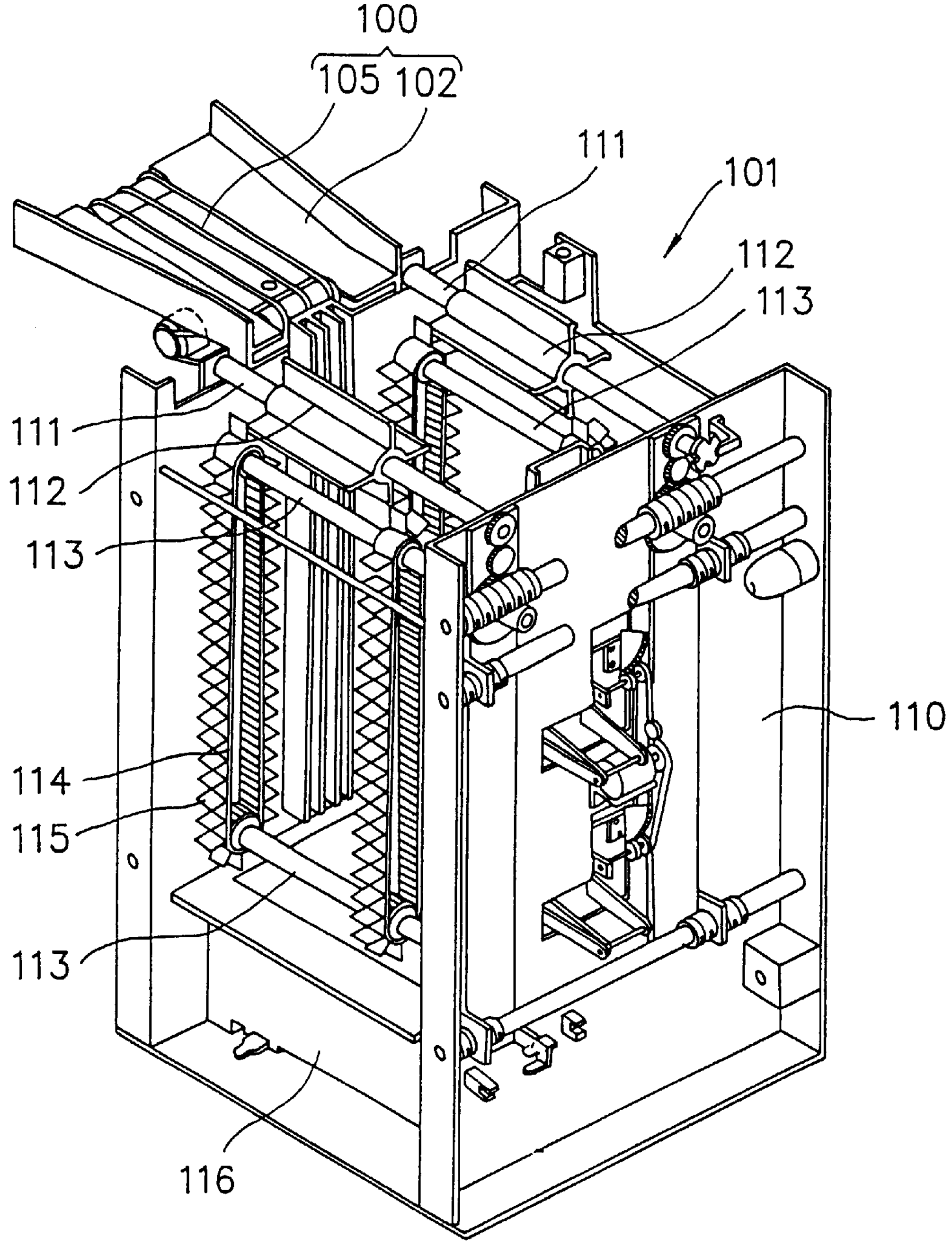
FIG. 5 Prior Art
FIG. 5 is a perspective view of the sheet discharging apparatus proposed by the present applicant for a printing machine.
Figure 6:
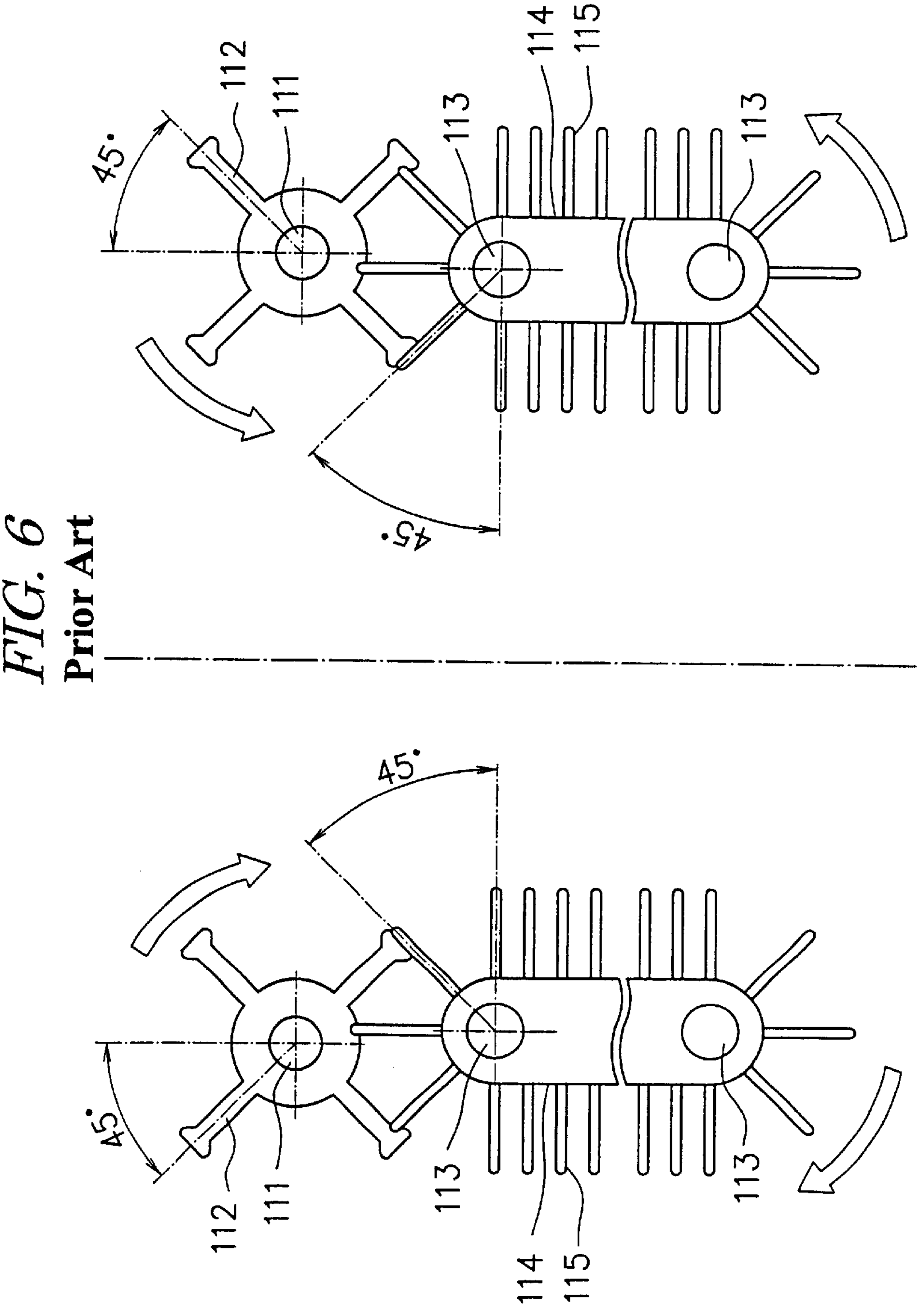
FIG. 6 Prior Art
FIG. 6 is a side view illustrating a conveying mechanism of the sheet discharging apparatus as shown in FIG. 5.
Figure 7:
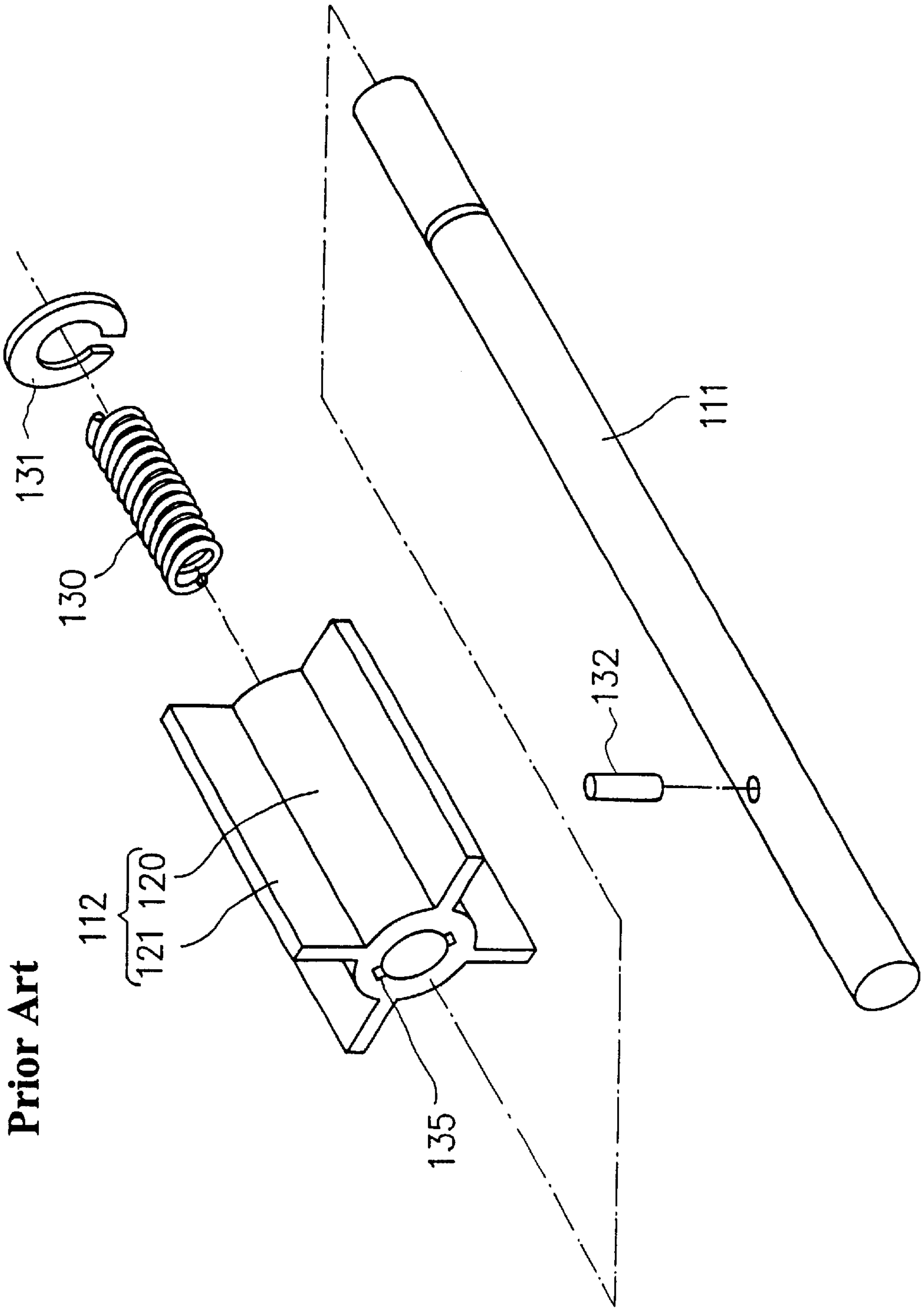
FIG. 7 Prior Art
FIG. 7 is an exploded perspective view of a rotating blade of the sheet discharging apparatus as shown in FIG. 5.
Figure 8:
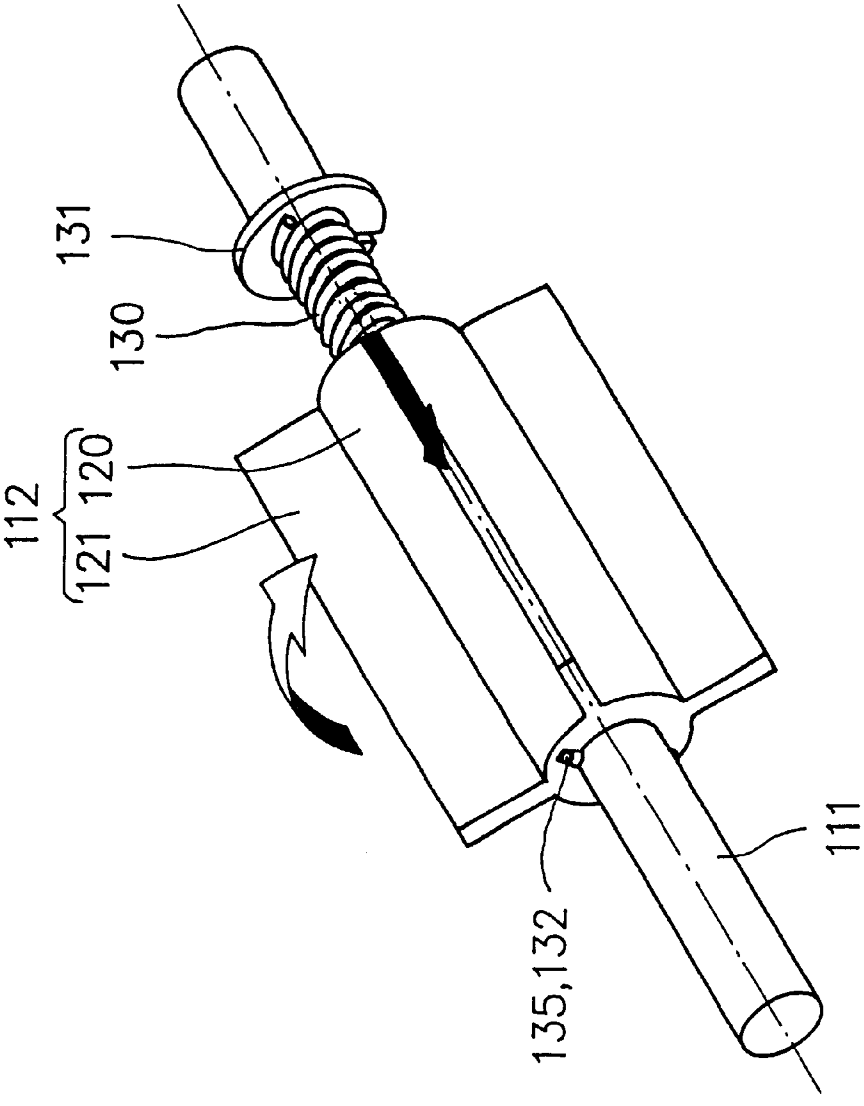
FIG. 8 Prior Art
FIG. 8 is a perspective view of a rotating blade of the sheet discharging apparatus as shown in FIG. 4.
Figure 9:
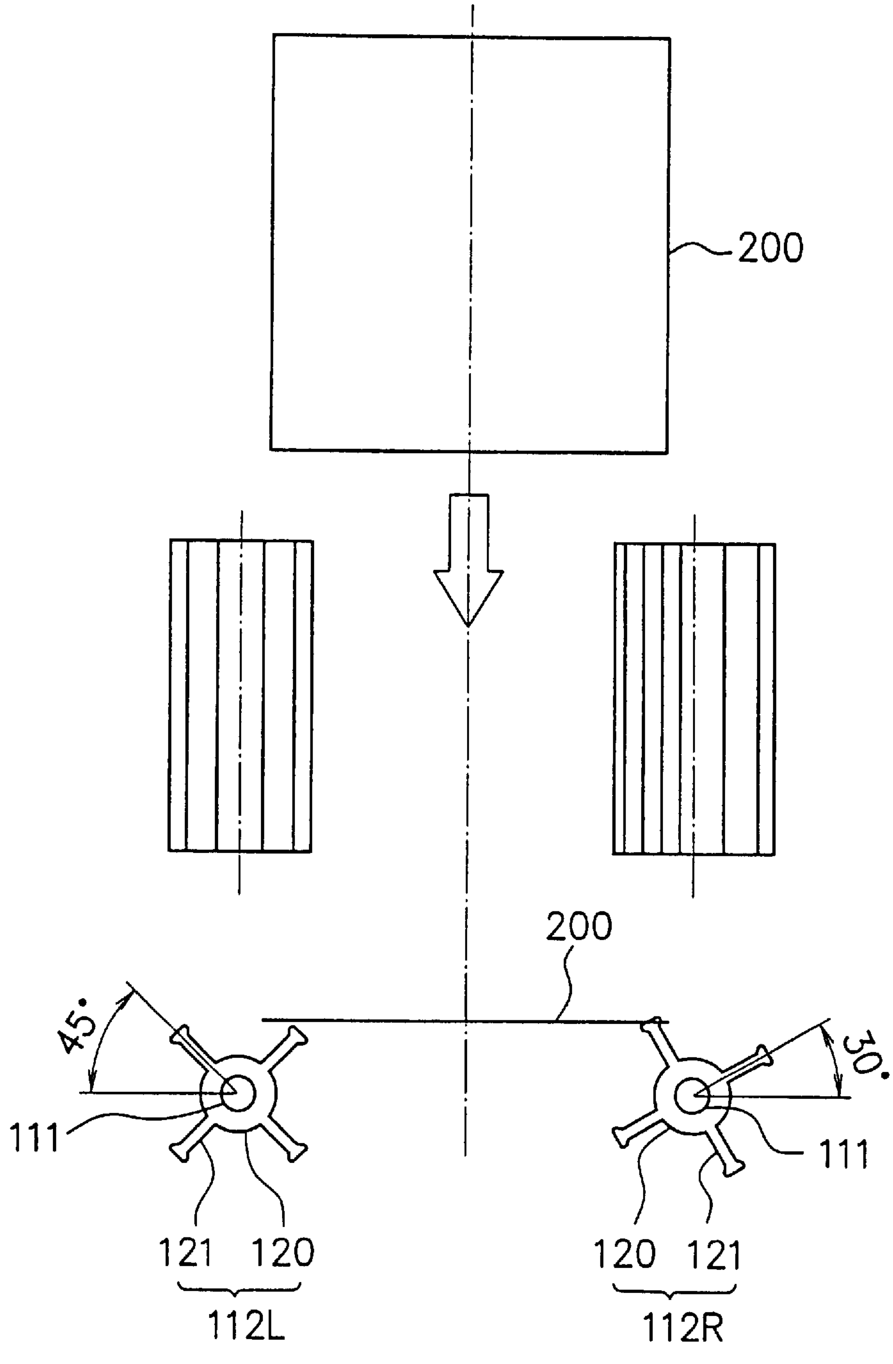
FIG. 9 Prior Art
FIG. 9 shows an elevation view and a side view illustrating a problem of a rotating blade in the sheet discharging apparatus as shown in FIG. 5.
Figure 10:
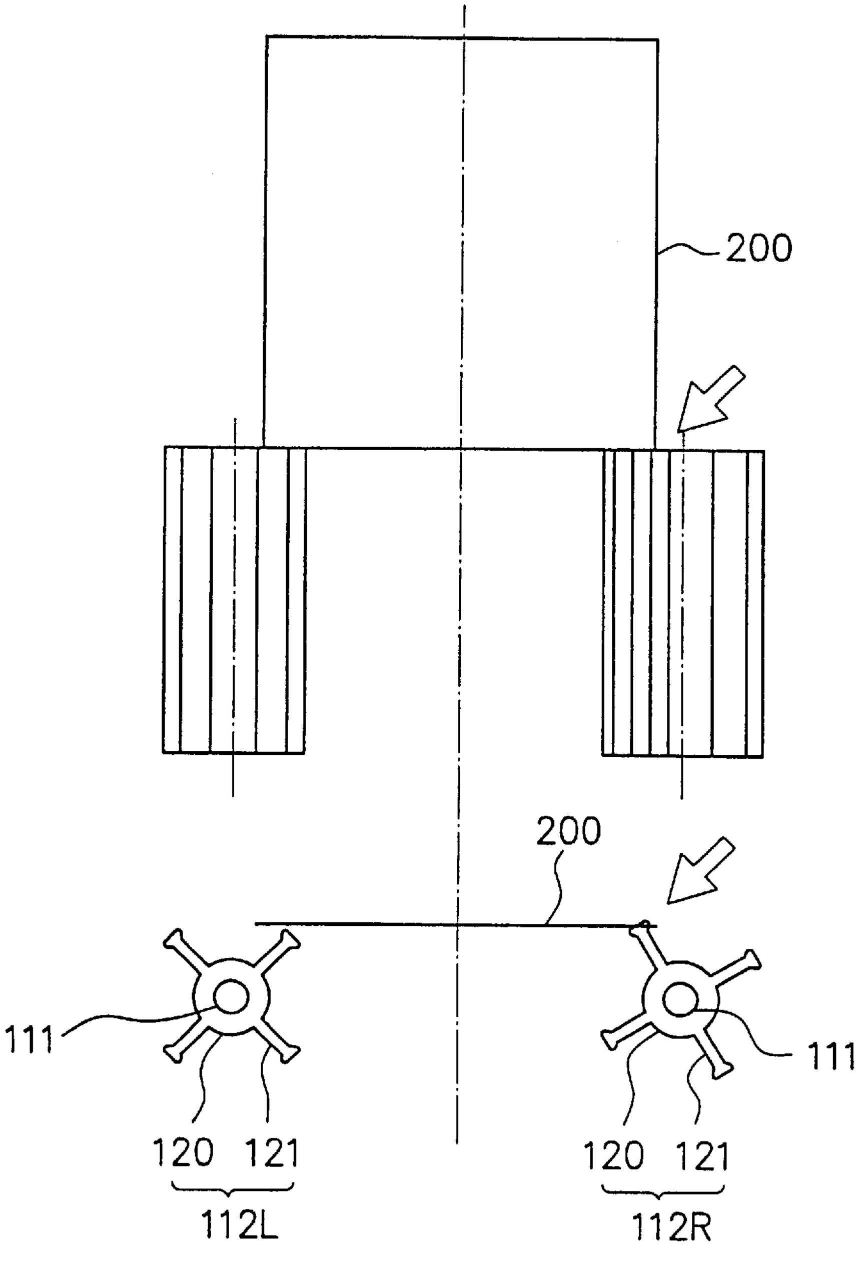
FIG. 10 Prior Art
FIG. 10 shows an elevation view and a side view illustrating a problem of a rotating blade in the sheet discharging apparatus as shown in FIG. 5.

Constitution of the sheet discharging apparatus of the present invention, except a rotating blade and a shaft for rotating the same, is identical to that of the related art as explained by referring to FIG. 5. Referring to FIGS. 1 and 2, constitution of important elements of the present invention, a rotating blade 1 and a shaft 3, will be explained.

Similarly to the rotating blade of the conventional sheet discharging apparatus as explained before, the rotating blade 1 of the present invention is so constituted that it gets detached from a pin 15 when it is moved in an axial direction by external force. The point of this embodiment is that rotational phases of the respective two rotating blades 1 always coincide with each other when each of the rotating blades 1 engages each of the pins 15 again after the external force disappears.

The sheet discharging apparatus of the present embodiment includes a pair of the rotating blades 1, 1, which rotate in directions opposite to each other for conveying a printing sheet downwards. For clarity of explanation, only one rotating blade 1 will be explained.

The sheet discharging apparatus receives a rectangular sheet horizontally discharged from the printing machine, conveys the sheet downwards, and stacks it on a predetermined position. Ink on the sheet is dried during conveyance of the sheet.

The sheet discharging apparatus has a frame serving as a main body thereof. A pair of shafts 3, 3 is substantially horizontally mounted on the frame at a predetermined distance away from each other. The pair of the shafts 3, 3 is situated parallel to each other along two side edges of the sheet to be received. The right and the left shafts 3, 3 rotate anticlockwise and clockwise, respectively. They are driven by a common driving source in synchronization with each other.

The each rotating blade 1 has the shaft 3 as supporting means rotatably attached thereto. The rotating blade 1 has a hollow cylindrical axis portion 5 having a through hole 7 into which the shaft 3 is rotatably fitted and plural plates 9 attached to an outer circumferential surface of the axis portion 5. The plate 9 is parallel to the shaft 3 and radially arranged to be spaced apart by a predetermined angular interval therebetween in a rotating direction of the axis. In this embodiment, four rectangular plates 9 are arranged to be spaced apart by an angle of 90°. These plates 9 support the side edge of the sheet.

Urging means for pressing the rotating blade 1 in an axial direction of the shaft is attached to the shaft 3. The urging means of this embodiment is a coil spring 11 as an elastic pressing member. The coil spring 11 is attached to the shaft 3 at a rear side of the rotating blade 1. An annular stopper 13 is attached to the shaft 3 at a rear side of the coil spring 11. The coil spring 11 presses a rear portion of the rotating blade forward while being compressed with a rear end thereof engaged by the stopper 13.

The pin 15 as an engaging member is attached to the shaft 3 at a forward side of the rotating blade 1. The pin 15 is in the shape of a solid cylinder. The pin 15 is fixed to the shaft 3 with a part thereof inserted into a hole formed in a circumferential surface of the shaft 3.

An engaging portion 17 for engaging the pin 15 is attached to a front end of the axis portion 5 of the rotating blade 1. The engaging portion 17 is approximately in the shape of a hollow cylinder with a front end opened. The outside diameter of the engaging portion is identical to that of the axis portion 5 of the rotating blade 1. The inside diameter of the opened front end is larger than the outside diameter of the shaft 3. Recesses and protrusions in the shape of a serration are formed at the opened front end of the engaging portion. Namely, the recesses 21 and the protrusions 19 are alternately arranged along the rotational direction of the shaft 3. The engaging portion 17 includes a guiding slope 23 curving back and forth passing through the recesses and the protrusions in a direction of the shaft and continuing along a circumference of the shaft. The pin 15 engages the guiding slope 23. In this embodiment, the four protrusions 19 and the four recesses 21 are alternately and circumferentially arranged to be spaced apart by an angle of 45°. The bottom of each recess has a notch 25 formed therein for stably engaging the pin 15.

The engaging portion 17 is attached to the rotating blade 1 in a predetermined phase relative to the rotating blade 1. The predetermined phase means that each of the protrusions 19 or the recesses 21 is constantly positioned to the respective plates 9 of the rotating blade 1 in the rotating direction of the shaft 3. In the present embodiment, each of the four protrusions 19 or the four recesses 21 is constantly positioned to each of the four plates 9. That is, each of the protrusions 19 of the engaging portion 17 coincides with each of the plates 9 of the rotating blade 1, or each of the recesses 21 of the engaging portion 17 coincides with each of the plates 9 of the rotating blade 1.

Figure 1:
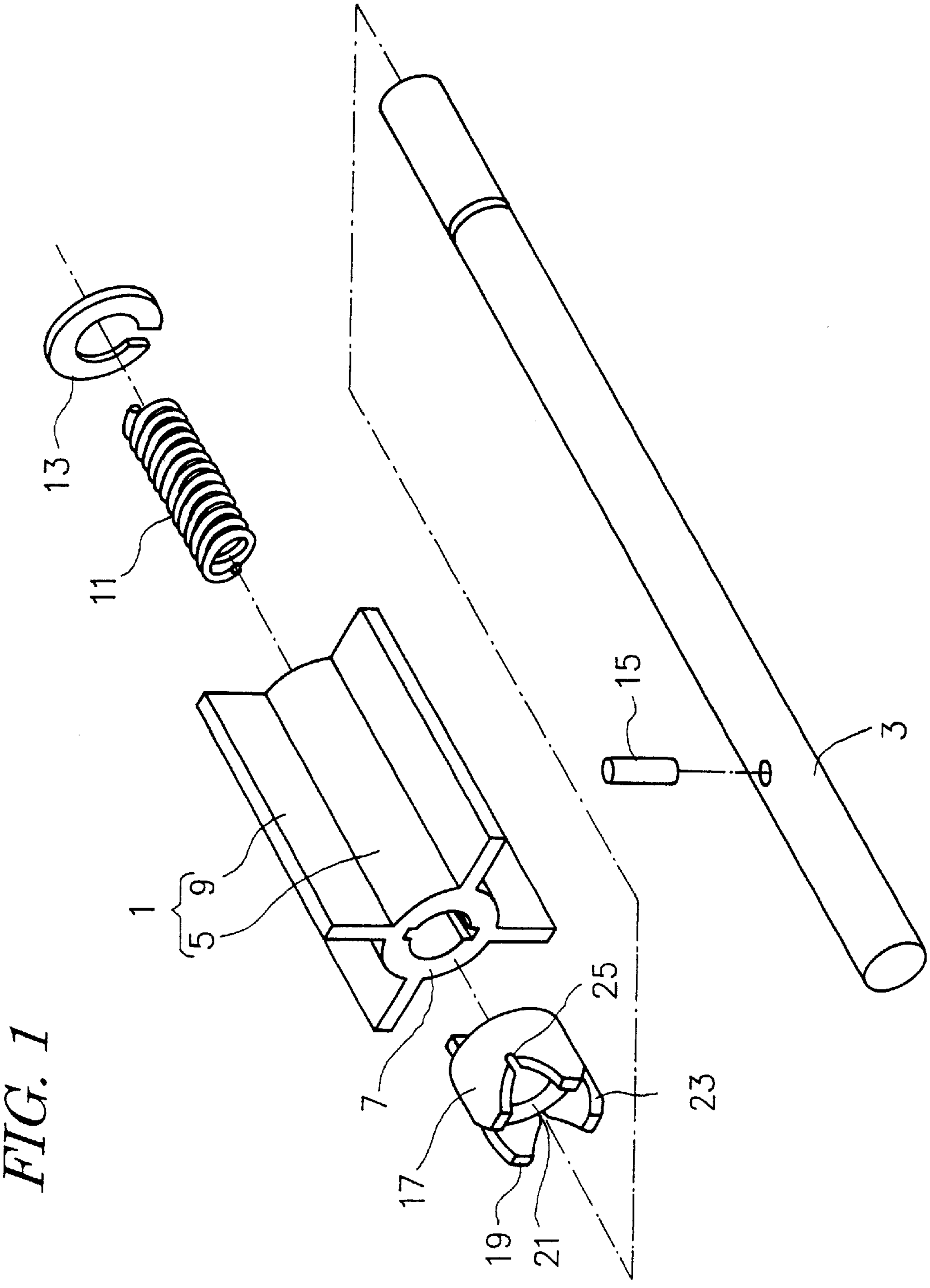
FIG. 1 is an exploded perspective view of a rotating blade in one embodiment of the present invention.

As illustrated in FIG. 1, the pin 15, the engaging portion 17, the rotating blade 1, the coil spring 11, and the stopper 13, all of which has been explained before, are assembled on the shaft 3. As illustrated in FIG. 2, the coil spring 11 is compressed to urge the rotating blade 1 forward. The engaging portion 17 of the rotating blade 1 engages the pin 15. Namely, the guiding slope 23 of the engaging portion 17 presses the pin 15. The guiding slope 23 receives reaction exerted in the rotational direction when pressing the pin 15, thereby being rotated around the shaft 3 together with the rotating blade 1. When the pin 15 falls into the notch 25, the rotating blade 1 and the engaging portion 17 is positioned. Thus, the engaging portion 17 is positioned to the pin 15 of the shaft 3, the rotating blade 1 is positioned to the shaft 3 in the rotating direction, and the shaft 3 and the rotating blade 1 are joined in the rotational direction.

Next, operation in the constitution thus described will be explained.

Figure 2:
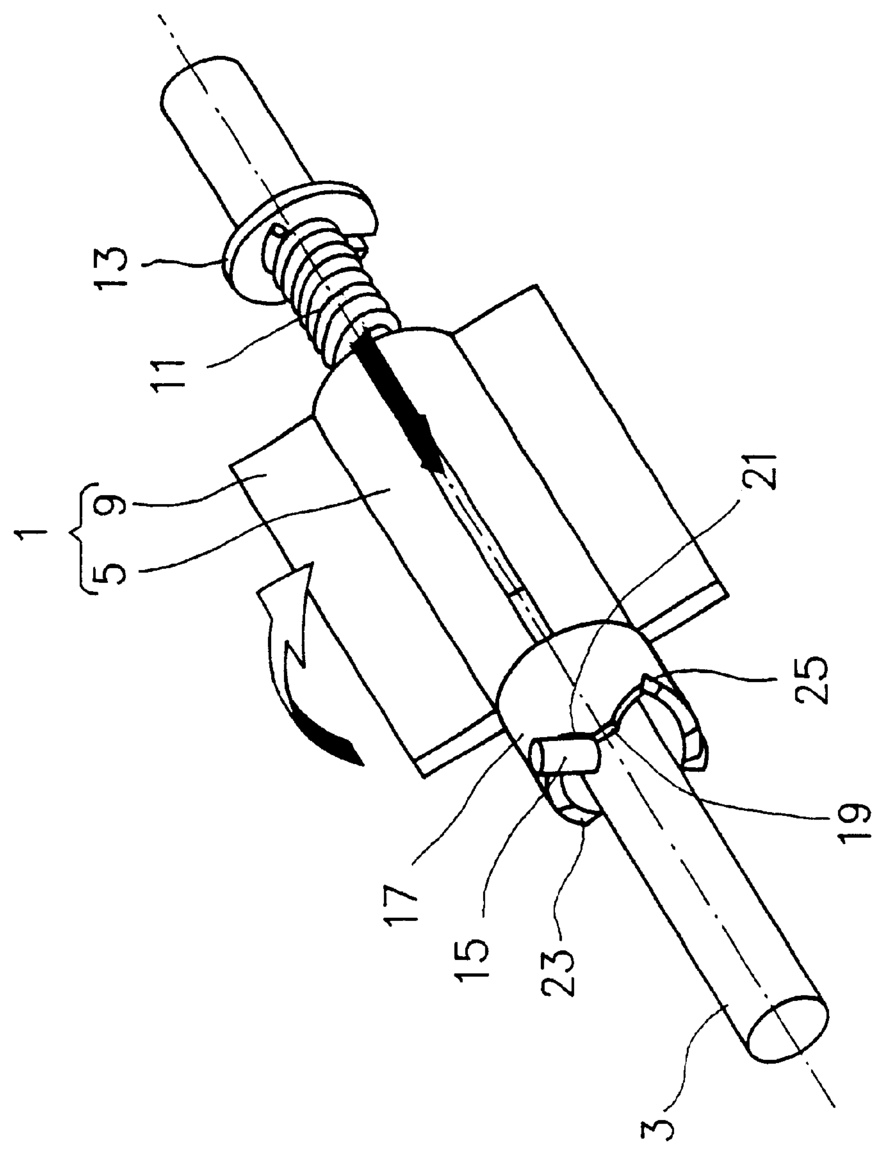
FIG. 2 is a perspective view of a rotating blade in one embodiment of the present invention.

As illustrated in FIG. 2, the coil spring 11 presses the rotating blade 1, thereby allowing the engaging portion 17 to engage the pin 15. Therefore, the shaft 3 and the rotating blade 1 are integrally joined by the pin 15 and the engaging portion 17. Accordingly, when the shaft 3 rotates, the rotating blade 1 can rotate.

In the present sheet discharging apparatus, endless belts are situated below the rotating blade 1 for conveying the printing sheet downwards. Suppose that sheet jamming occurs on the endless belts and the printing sheet jammed is needed to be removed therefrom. An operator inserts his hand between the pair of the rotating blades 1. If the hand touches the rotating blade 1, the rotating blade 1 moves in a direction opposite to the urging direction by the coil spring 11, thereby being freed from rotation of the shaft 3. The hand is safe since the rotating blade 1 is disconnected from driving force of the shaft 3.

When the printing sheet is removed, the hand leaves the rotating blade 1. External force exerted on the rotating blade 1 disappears, so that the rotating blade 1 is moved toward the pin 15 by the urging force of the coil spring 11. And, the engaging portion 17 of the rotating blade 1 engages the pin 15. Namely, the guiding slope 23 of the engaging portion 17 contacts the pin 15.

Figure 3A:
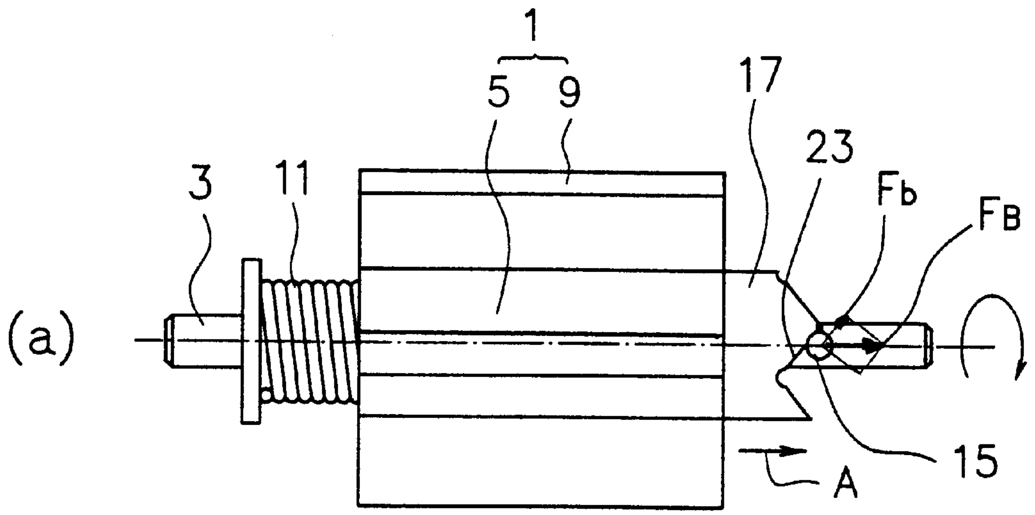
FIG. 3(*a*) is a view illustrating a rotating blade in an operating condition in one embodiment of the present invention.
Figure 3B:
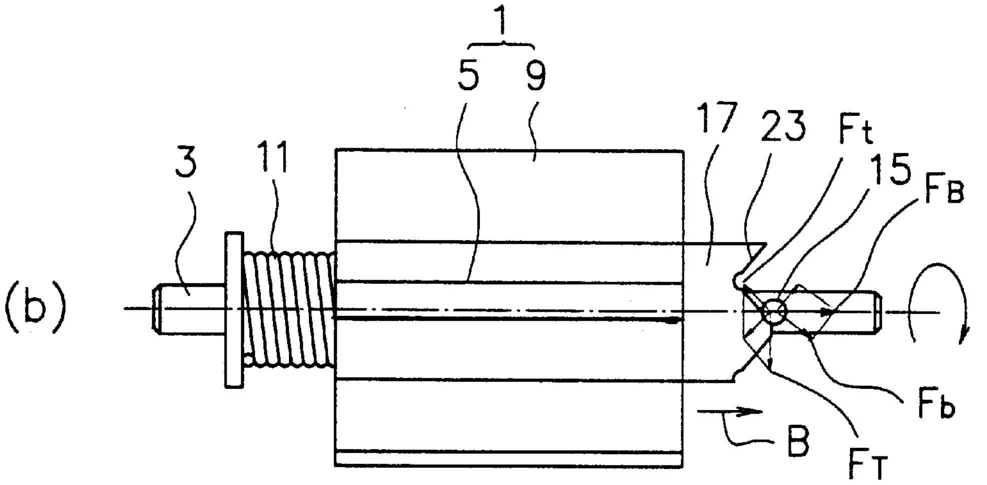
Figure 3C:
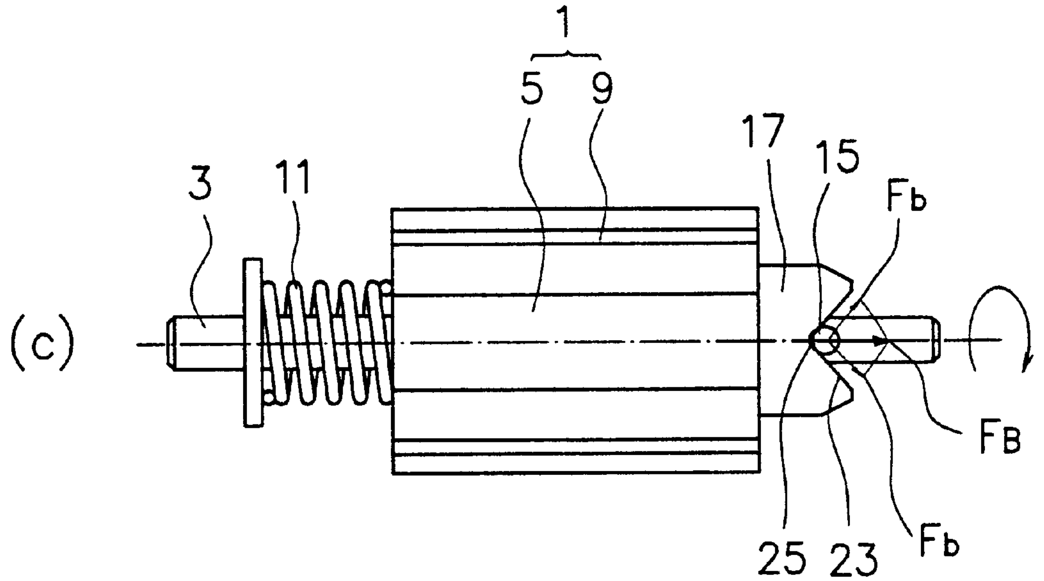
Figure 4:
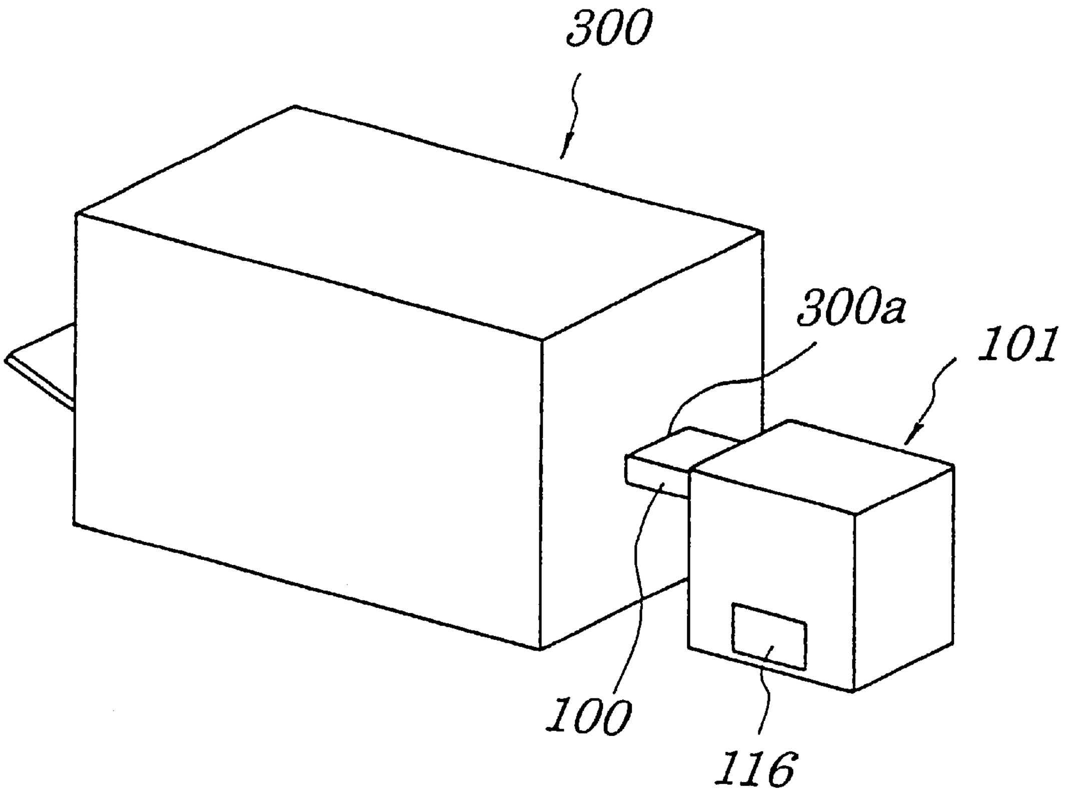
FIG. 4 Prior Art
FIG. 4 is a perspective view of a sheet discharging apparatus, a printing machine, and a sheet conveying apparatus which are proposed by the present applicant.

In FIGS. 3(*a*), 3(*b*), and 3(*c*), force exerted on the engaging portion 17 by the pin 15 is illustrated by using vectors. $F_B$ is the urging force by the coil spring 11. $F_b$ is component force of $F_B$ that is parallel to the guiding slope 23 of the engaging portion 17. $F_T$ is rotational torque. $F_t$ is component force of $F_T$ that is parallel to the guiding slope 23 of the engaging portion 17.

In a state shown in FIG. 3(*a*), force $F_b$ is exerted on the guiding slope 23 of the engaging portion 17, thereby urging the engaging portion 17 to move in a direction shown by an arrow "A".

In a state shown in FIG. 3(*b*), force $F_b$ and force $F_t$ are exerted on the guiding slope 23 of the engaging portion 17. In the case of $F_b<F_t$, the engaging portion 17 moves in a direction shown by an arrow "B". The rotating blade 1 is rotated freely relative to the shaft 3 by the rotating torque.

In the states shown in FIGS. 3(*a*) and 3(*b*), the urging force $F_B$ is always exerted on the engaging portion 17 by the coil spring 11. In the case where the rotating torque FT is not exerted on the rotating blade 1, namely in the case of $F_b>F_t$ at normal printing, the engaging portion 17 comes to a position shown in FIG. 3(*c*) while being urged by force $F_b$. When the engaging means 17 is set at the position, the plates 9 of the rotating blade 1 is positioned in a predetermined state relative to the pin 15 fixed on the shaft 3.

Thus, each of the paired rotating blades 1, 1 can be restored to the same rotational phase by the automatic restoring operation of each engaging portion 17, even after each of the pair gets detached from each of the respective pins 15. Accordingly, even though the rotating blade 1 comes to rotate freely while being touched by an operator on duty, the rotating blade 1 should be afterwards restored to the predetermined phase relative to the shaft 3. Therefore, no inconvenience may happen in sheet conveyance continued afterwards.

According to the present invention, in a stencil discharging machine where a rotating blade is rotatably attached to a rotating shaft, and is pressed to engage an engaging member of the shaft so that the rotating blade and the shaft is joined to rotate together; an engaging portion is formed at a front end of the rotating blade, the engaging portion has a recess and a protrusion alternately formed along a rotating direction of the shaft, and the engaging portion and the rotating blade are arranged so as to have a constant relation to each other. Thus, even after the rotating blade comes to rotate freely while being influenced by external force, the rotating blade can be stabilized at a position where the engaging member engages the recess of the engaging portion, since the recess and the protrusion of the engaging portion are urged to contact the engaging member. Therefore, the shaft and the rotating blade can be restored to a predetermined rotational phase relative to each other, and each phase of the paired rotating blade always coincide with each other. Hence, a printing sheet can be conveyed downwards with two side edges thereof uniformly supported.

What is claimed is:

1. A sheet discharging apparatus adapted to receive a sheet conveyed thereto, said sheet discharging apparatus comprising:

a pair of axes situated parallel to each other at a predetermined distance away from each other, said axes being located along two side edges of said sheet, and rotated in directions opposite to each other;

a pair of supporting means, each supporting means rotatably attached to each of said axes and having at least one supporting portion for supporting said side edge of said sheet;

urging means attached to said respective axes and pressing rear portions of said supporting means forward;

engaging members attached to said axes respectively, each engaging member engaging each of said supporting means pressed by said urging means so that said supporting means and said axis are joined to rotate in the same direction; and engaging portions formed at respective front portions of said supporting means, each engaging portion having a recess and a protrusion alternately formed along a rotating direction of said axis, said recess allowing each of said supporting means to be situated at a predetermined position in said rotating direction of said axis when engaging said engaging member.

2. A sheet discharging apparatus adapted to receive a rectangular sheet conveyed thereto, said sheet discharging apparatus comprising:

a pair of axes situated parallel to each other at a predetermined distance away from each other, said axes being located along two side edges of said sheet and rotated in directions opposite to each other, said side edges being parallel to a conveying direction of said sheet, a pair of rotating blades, each rotating blade having an axis portion rotatably attached to each of said axes and plural plates attached to an outer circumferential surface of said axis portion, said plates being arranged to be spaced apart by a predetermined angular interval therebetween in a rotating direction of said axis and being parallel to said axes, each of said plates supporting said side edge of said sheet;

elastic pressing members attached to each of said axes and pressing rear portions of said rotating blades forward;

engaging members protrusively attached to respective outer circumferential surfaces of said axes, each engaging member engaging said rotating blade pressed by said elastic pressing member so that said rotating blade and said axis are joined to rotate in the same direction; and engaging portions formed at front portions of said respective rotating blades, each engaging portion having same number of recesses and protrusions as that of said plates, said recess and said protrusion being alternately arranged along said rotating direction of said axis, each recess allowing said rotating blade to be situated at a predetermined position in said rotating direction of said axis when engaging said engaging member.

3. A sheet discharging apparatus as claimed in claim 2, wherein said engaging portion having said recesses and said protrusions includes a guiding slope, said guiding slope curving back and forth passing through said recesses and said protrusions in a direction of said axis and continuing along a circumference of said axis, and said engaging member is positioned at a bottom of said recess while being pressed and moved along said guiding slope.

4. A sheet discharging apparatus as claimed in claim 3, wherein said engaging portion includes notches, each notch being formed at the bottom of each recess for engaging said engaging member.

* * * * *